(12) United States Patent
He

(10) Patent No.: US 10,063,824 B2
(45) Date of Patent: Aug. 28, 2018

(54) MAPPING IMAGE/VIDEO CONTENT TO TARGET DISPLAY DEVICES WITH VARIABLE BRIGHTNESS LEVELS AND/OR VIEWING CONDITIONS

(71) Applicant: Apple Inc., Cupertino, CA (US)

(72) Inventor: Haiyan He, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 14/636,682

(22) Filed: Mar. 3, 2015

(65) Prior Publication Data
US 2016/0125580 A1 May 5, 2016

Related U.S. Application Data

(60) Provisional application No. 62/075,510, filed on Nov. 5, 2014.

(51) Int. Cl.
*H04N 9/68* (2006.01)
*H04N 5/202* (2006.01)
(Continued)

(52) U.S. Cl.
CPC .............. *H04N 9/68* (2013.01); *G06T 15/30* (2013.01); *G09G 3/2003* (2013.01); *H04N 5/20* (2013.01);
(Continued)

(58) Field of Classification Search
None
See application file for complete search history.

(56) References Cited

U.S. PATENT DOCUMENTS

| 7,106,474 B1 * | 9/2006 | Haikin | H04N 1/603 |
| | | | 358/1.9 |
| 7,639,893 B2 | 12/2009 | Duan et al. | |

(Continued)

FOREIGN PATENT DOCUMENTS

| EP | 1411714 A2 | 4/2004 |
| WO | 2013/086169 A1 | 6/2013 |
| WO | 2014/130343 A2 | 8/2014 |

OTHER PUBLICATIONS

International Preliminary Application No. PCT/US2015/058104; Int'l Search Report and the Written Opinion; dated Mar. 4, 2016; 13 pages.

(Continued)

*Primary Examiner* — Yi Wang
(74) *Attorney, Agent, or Firm* — Baker & Hostetler LLP; Robert L. Hails

(57) ABSTRACT

An image processing system performs intensity mapping in a manner that avoids color shifts and conserves processing resources while adapting image data for a target display device. The image processing system may convert input image data to a target color space in which brightness components are orthogonal to other color components. When intensity mapping is performed on image data, the intensity mapping operations do not induce the color shifts that were created in these other proposals. Resource conservation may be achieved by altering operation of perceptual quantization processes as used in other intensity mapping systems. Where prior proposals performed perceptual quantization on all color components of the image data being processed, the disclosed embodiments perform perceptual quantization on only a brightness color component of image data. Thus, these embodiments avoid resource (Continued)

expenditures that otherwise would be spent on perceptual quantization of two other color components.

28 Claims, 6 Drawing Sheets
(2 of 6 Drawing Sheet(s) Filed in Color)

(51) Int. Cl.
    *G06T 15/30*    (2011.01)
    *G06T 5/00*     (2006.01)
    *G06T 5/50*     (2006.01)
    *H04N 5/20*     (2006.01)
    *G09G 3/20*     (2006.01)
(52) U.S. Cl.
    CPC ..... *H04N 5/202* (2013.01); *G09G 2320/0626* (2013.01); *G09G 2340/06* (2013.01)

(56) References Cited

U.S. PATENT DOCUMENTS

| | | | |
|---|---|---|---|
| 8,451,340 B2 | 5/2013 | Tamagawa | |
| 8,873,883 B2 | 10/2014 | Zhang et al. | |
| 2004/0119995 A1* | 6/2004 | Nishi | H04N 1/6027 358/1.9 |
| 2007/0081177 A1* | 4/2007 | Um | H04N 1/6058 358/1.9 |
| 2009/0135303 A1* | 5/2009 | Sugiyama | H04N 5/145 348/708 |
| 2010/0232694 A1 | 9/2010 | Oicherman et al. | |
| 2011/0310116 A1* | 12/2011 | Muijs | G06T 5/007 345/617 |
| 2011/0316973 A1* | 12/2011 | Miller | G09G 3/003 348/43 |
| 2013/0207996 A1* | 8/2013 | Shibuya | G06F 3/1454 345/604 |
| 2016/0005349 A1* | 1/2016 | Atkins | H04N 5/20 345/591 |
| 2016/0019675 A1* | 1/2016 | Kamimura | H04N 1/646 382/162 |

OTHER PUBLICATIONS

"Proposed Preliminary Draft New Report—Image Dynamic Range in Television Systems," Radiocommunication Study Groups, ITU, Document 6C/146-E, Apr. 5, 2013, pp. 1-67.

International Patent Application No. PCT/US2015/058104; Int'l Preliminary Report on Patentability; dated May 18, 2017; 10 pages.

* cited by examiner

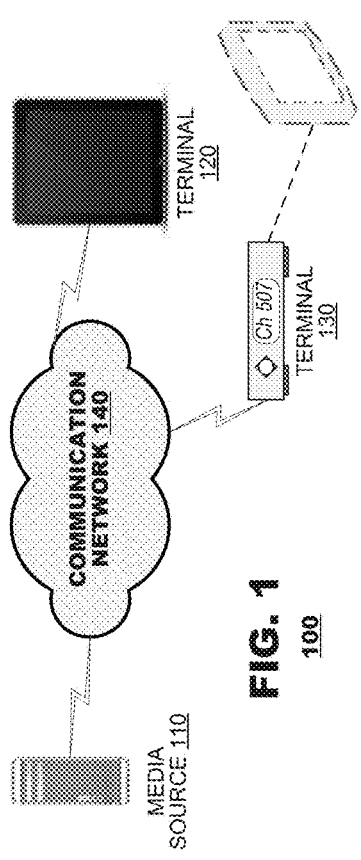
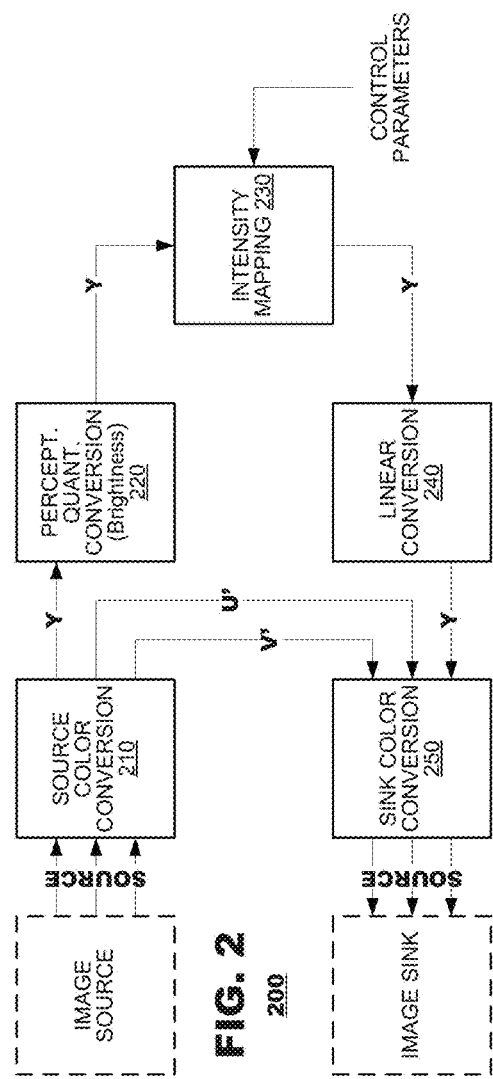

300

400

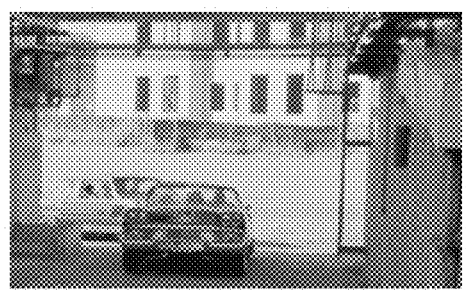 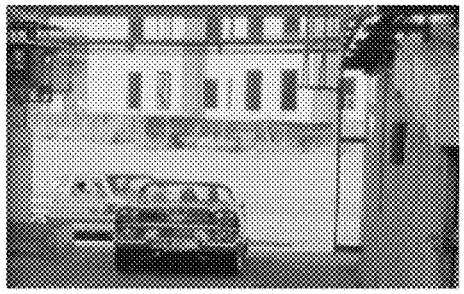
(a)            (b)
FIG. 5
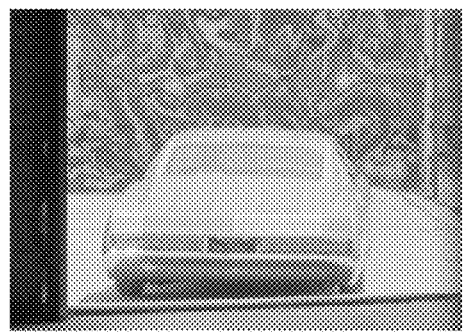 
(a)            (b)
FIG. 6

900

MAPPING IMAGE/VIDEO CONTENT TO TARGET DISPLAY DEVICES WITH VARIABLE BRIGHTNESS LEVELS AND/OR VIEWING CONDITIONS

CROSS-REFERENCE TO RELATED APPLICATION

This application benefits from priority afforded by U.S. patent application 62/075,510, filed Nov. 5, 2014, the disclosure of which is incorporated herein by reference.

BACKGROUND

The present disclosure relates to management of image data in electronic video systems and, in particular, to management of image display for rendering on a variety of display devices.

Modern display devices vary in the brightness, color gamut and dynamic range of the images that they can render. Cathode ray tube (commonly, "CRT") displays commonly are rated at ~100 nits (100 candelas per square meter), while LCD displays for residential and office-based applications may be rated at ~400 nits. Still other displays, such as LCD-based billboard displays may be rated at higher levels. And research efforts are underway to develop new display technologies in the range till 10,000 nits.

Moreover, image processing applications are generating image data at higher dynamic ranges. Where image data values may have been defined using 8 or 10 bit depth color values, newer image processing applications are generating such image data values at 12 or perhaps 16 bit values. The increasing dynamic range permits image content to be rendered at finer quantization levels than before. And, of course, different display devices may support different dynamic ranges.

Additionally, viewing conditions may vary considerably. In some applications, a display device may be viewed in a darkened room where the display is the only source of illumination. In other applications, a display device may be used as an electronic billboard in a bright outdoor environment. Each of these factors—display brightness, dynamic range of the data that a display supports and ambient viewing conditions around the display—may affect a viewer's perception of image data as it is displayed by a device.

"Intensity mapping" has been proposed as a technique to tailor image data for rendering on a display device that accounts for factors such as display brightness, viewing conditions and the like. Techniques have been proposed in ITU_R document 6C/146-E (April 2013), WO 2014/0130343 (2014) and WO 2013/086169 (2013). Although such proposals address the need to adjust image brightness according to these factors, they have certain disadvantages. First, they introduce color shifts that can corrupt some portions of image data. Second, they are computationally expensive.

BRIEF DESCRIPTION OF THE DRAWINGS

The file of this patent or application contains at least one drawing/photograph executed in color. Copies of this patent or patent application publication with color drawing(s)/photograph(s) will be provided by the Office upon request and payment of the necessary fee.

FIG. 1 illustrates an image distribution system according to an embodiment of the present disclosure.

FIG. 2 is a functional block diagram of an image processing system according to an embodiment of the present disclosure.

FIGS. 5-8 illustrate exemplary images processed according to various embodiments of the present disclosure and compare those images to mapping processes of other proposals.

DETAILED DESCRIPTION

Figure 3:
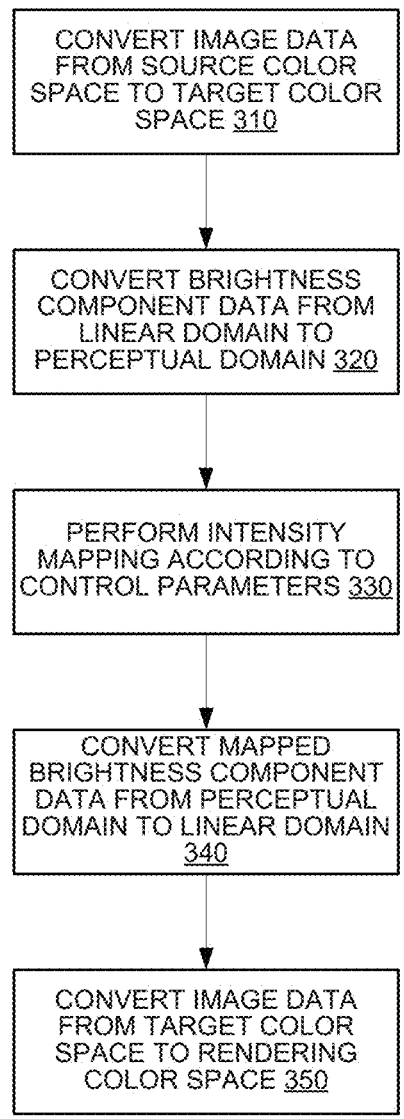
FIG. 3 illustrates a method according to an embodiment of the present disclosure.

Embodiments of the present disclosure provide an image processing system that performs intensity mapping in a manner that avoids color shifts of the known proposals and conserves processing resources. According to these embodiments, an image processing system converts input image data to a target color space in which brightness components are orthogonal to other color components. When intensity mapping is performed on image data, the intensity mapping operations do not induce the color shifts that were created in these other proposals.

Resource conservation may be achieved by altering operation of perceptual quantization processes as used in the intensity mapping systems. Prior proposals performed perceptual quantization on all color components of the image data being processed (specifically, L, M and S components, during the conversion to the IPT color space). Embodiments of the present disclosure perform perceptual quantization on only a single color component of image data (for example, a Y component in a Yu'v' color space). Thus, these embodiments avoid resource expenditures that otherwise would be spent on perceptual quantization of two other color components.

FIG. 1 illustrates an image distribution system 100 according to an embodiment of the present disclosure. The system may include a media source 110 and one or more terminals 120, 130 provided in communication by a communication network 140.

The media source 110 may supply image data to the terminals 120, 130 typically as broadcast data or on request by the terminals 120, 130. The image data may have been authored by a content provider (not shown) using a predetermined color space. Thus, the image data is intended to be displayed by the terminals 120, 130 in a manner that displays the image data accurately with reference to the predetermined color space, regardless of differences that may exist between the terminals.

The terminals 120, 130 may be devices that receive the image data from the media source 110 and process it for display. The principles of the present disclosure find application with a variety of terminals including, for example, smartphones, tablet computers, laptop computers, desktop computers, portable media players, electronic billboards, displays, and set top boxes. In some applications, the image processing operations of the present disclosure may be performed in devices such as set top boxes that are associated with displays but do not display image data themselves.

FIG. 2 is a functional block diagram of an image processing system 200 according to an embodiment of the present disclosure. The system 200 may find application to tailor source image data for rendering on a display device.

The system 200 may include a source converter 210, a perceptual quantization converter 220, an intensity mapping unit 230, a linear converter 240 and a sink color converter 250. The source converter 210 may convert image data from a source color space to a target color space in which brightness component data is orthogonal to other color components. The perceptual quantization converter 220 may convert brightness data Y from a linear domain to a perceptual domain. The intensity mapping unit 230 may alter brightness data for rendering on a destination display according to input control parameters. The linear converter 240 may convert the altered brightness data from the perceptual domain to a linear domain. The sink color converter 250 may convert image data from the linear conversion unit 240 to a color space that is appropriate for the display device for which the system 200 is being used.

As discussed, the source color converter 210 may convert image data from a source color space (for example, RGB) to a target color space where brightness components are orthogonal to other color components. In the example of FIG. 2, the color components are shown as Y (brightness), u' and v' (chrominance), respectively, as defined by CIE 1976 Uniformed Chromaticity Scale diagram.

In an embodiment, perceptual quantization conversion 220, intensity mapping 230 and linear conversion 240 may be performed according to the techniques disclosed in publication WO 2014/130343, with some modification. Perceptual quantization conversion may map linearly-quantized brightness values to other values that better match contrast sensitivity thresholds in a human visual system. As discussed in WO 2014/130343 ("the '343 document"), FIGS. 1 & 2 and accompanying discussion, the disclosure of which is incorporated herein, perceptual quantization is performed on all color components of an LMS color space. In the embodiment illustrated in FIG. 2, it is sufficient to perform perceptual quantization only on the color component that corresponds to brightness (Y in the example of FIG. 2), thereby saving resources that otherwise would have been expended on perceptual quantization of the other two color components (U' and V').

The intensity mapping 230 also may be performed as discussed in the '343 document FIGS. 1-2 and their accompanying discussion. As discussed in the '343 document, intensity mapping is performed on an I color component in an IPT color space; the I component generally corresponds to a brightness indicator but it is not orthogonal to the other color components of the IPT color space. In the embodiment of FIG. 2 above, intensity mapping 230 may operate on a brightness color component that is orthogonal to the other color components of the governing color space (e.g., Y in the YU'V' space, Y in the XYZ space or L in the L*a*b* space).

Control parameters may be derived from data representing brightness of the display on which image data will be rendered, its dynamic range and/or viewing conditions of the display.

The linear conversion 240 may be performed as an inversion of the perceptual quantization conversion 220 processes. It may operate as the Gamut Mapper 3D LUT 185, as described in the '343 document. Thus, intensity mapped brightness data may be converted back to a linear scale.

The sink color conversion 250 may convert the image data from the color space used in the intensity mapping process to a color space that is appropriate for a sink device (e.g., a display or a storage unit). For example, if a display consumes RGB data, the image data may be converted to the RGB color space. Thereafter, the image data may be output to the sink device.

As discussed, intensity mapping may be performed in a color space where a brightness color component is orthogonal to other color components of the space. The Yu'v', XYZ and L*a*b* spaces are examples. The principles of the present disclosure may apply to other color spaces in which:

1. The luminance component is orthogonal to the Chroma plane;
2. The color space has a constant luma property, e.g., the brightness is generated in the linear light domain; and
3. Chroma components have a direct correlation to subjective color measurements (e.g. saturation & hue).

Thus, the principles of the present disclosure may be extended to still other color spaces FIG. 3 illustrates a method 300 according to an embodiment of the present disclosure. The method 300 may begin by converting image data from a source color space to a target color space in which brightness data is orthogonal to other color components (box 310). The method 300 may convert a brightness component of the image data from a linear domain to a perceptual domain (box 320). The method 300 may perform intensity mapping of the brightness component according to control parameters (box 330). Thereafter, the method 300 may convert the mapped brightness component from the perceptual domain to a linear domain (box 340) and convert the image data from the target color space to a color space of a display device (box 350).

Figure 4:
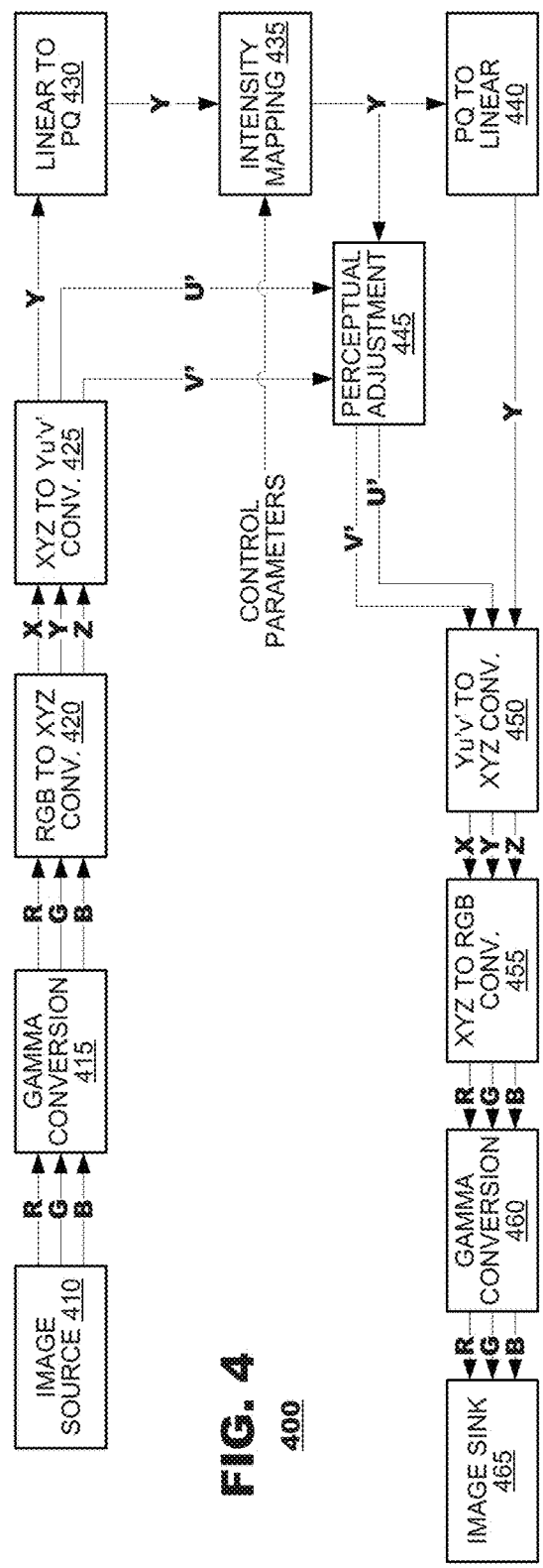
FIG. 4 is a block diagram of an image processing system according to another embodiment of the present disclosure.
Figure 7:
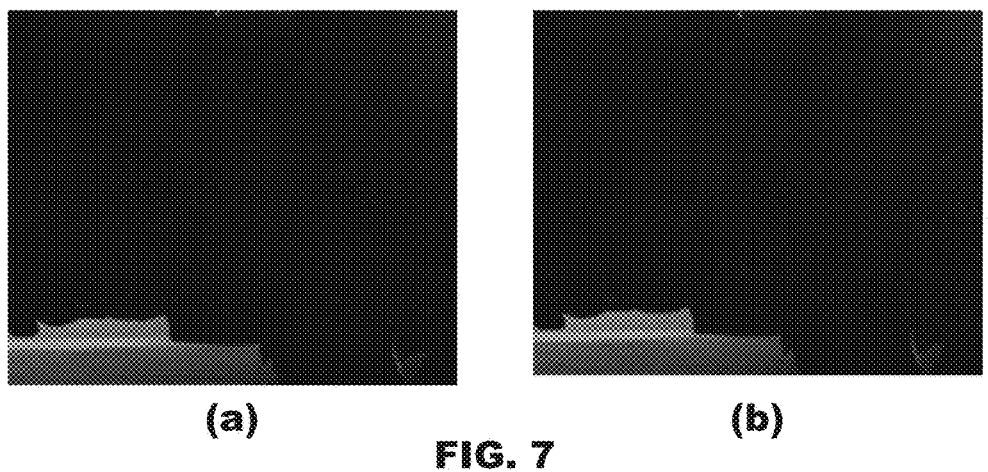
Figure 8:
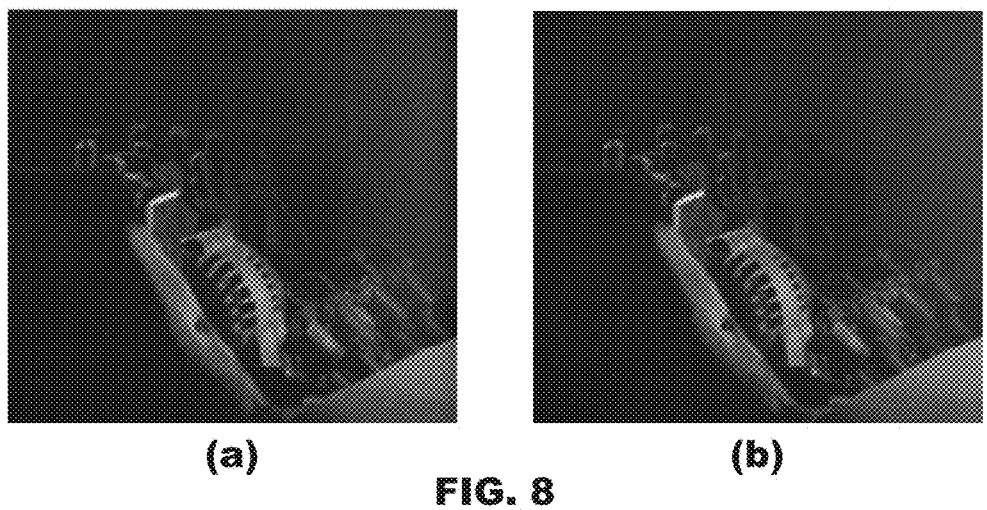

FIG. 4 is a block diagram of an image processing system 400 according to another embodiment of the present disclosure. In this embodiment, the system 400 may operate with an image source 410 that utilizes RGB color data and an image sink 465 that also utilizes RGB color data.

The system 400 may include a gamma conversion unit 415, an RGB to XYZ converter 420, an XYZ to Yu'v' converter 425, a linear to PQ converter 430, an intensity mapping unit 435, a PQ to linear converter 440, a perceptual adjustment unit 445, a Yu'v' to XYZ transform 450, an XYZ to RGB converter 455, a gamma conversion unit 460, and an image sink 465.

The gamma conversion unit 415 may convert input image data in a source color space to a linear representation. In the example of FIG. 4, RGB image data may be converted to a linear RGB representation. The RGB to XYZ converter 420 may convert image data from an RGB representation to an XYZ representation. The XYZ to Yu'v' converter 425 may convert the image data from an XYZ representation to a Yu'v' representation. The linear to PQ converter 430 may convert the Y component data from a linear scale to a perceptual scale. The intensity mapping unit 435 may alter Y component data for rendering on a destination display according to input control parameters. The PQ to linear converter 440 may convert the altered Y component data from the perceptual scale to a linear scale. The perceptual adjustment unit 445 may perform perceptual adjustments to color components based on the color appearance phenomena (e.g., Hunt effect, etc.). The Yu'v' to XYZ transform 450 may convert the Yu'v' data from the perceptual adjustment unit 445 to an XYZ color space. The XYZ to RGB converter 455 may convert the XYZ-based image data to an RGB color space. The gamma conversion unit 460 may perform gamma conversion of the RGB-based image data according to a transform that is appropriate for a target display device on which the image data will be displayed. The image sink 465 may consume the image data.

Control parameters may be derived from data representing the physical properties of display, e.g. the size of display, the brightness of the display on which image data will be rendered, its dynamic range and/or viewing conditions of the display.

The color space conversions 420, 425, 450 and 455 may be implemented as look up tables ("LUTs") that are indexed by the color data in the input color space and store converted color space values in the tables, which can be output from the conversion units 420, 425, 450 and 455. Accordingly, resources that otherwise would be spent to perform conversion dynamically may be conserved.

A variety of RGB color spaces have been defined for various image display applications. It may be convenient to transform the RGB image data from their native sources to the XYZ space prior to converting the image data to the Yu'v' space. Indeed, for a single system 400 to be compatible with a variety of RGB color spaces, the RGB to XYZ converter 420 may be provided with a plurality of conversion matrixes, one for each RGB color space that is supported, to perform conversions.

On the output side, the Yu'v' to XYZ converter 450 and the XYZ to RGB converter 455 may be replaced with a single Yu'v' to RGB converter (not shown), which may be implemented as a single LUT. Such an application may be appropriate for use in applications where the image sink 465 operates under a single color space.

In an embodiment, linear to perceptual quantization conversion 430, intensity mapping 435 and PQ to linear conversion 440 may be performed according to the techniques disclosed in publication WO 2014/130343, with some modification. As discussed in WO 2014/130343 ("the '343 document") FIGS. 1 & 2 and accompanying discussion, perceptual quantization is performed on all color components of an LMS color space. In the embodiment illustrated in FIG. 4, it is sufficient to perform perceptual quantization only on the brightness color component Y, thereby saving resources that otherwise would have been expended on perceptual quantization of the other two color components (u' and v').

The intensity mapping 435 also may be performed as discussed in the '343 document FIGS. 1-2 and their accompanying discussion. As discussed in the '343 document, intensity mapping is performed on an I color component in an IPT color space; the I component generally corresponds to a brightness indicator but it is not orthogonal to the other color components of the IPT color space. In the embodiment of FIG. 4 above, intensity mapping 435 may operate on a brightness color component Y that is orthogonal to the other color components u' and v' of the governing color space.

The PQ to linear conversion 440 may be performed as an inversion of the perceptual quantization 430 processes. Thus, intensity mapped brightness data may be converted back to a linear scale.

The image sink 465 may be a display device or a storage device to store image data prior to rendering on a display.

FIGS. 5-8 compare performance of intensity mapping processes of the prior proposal to processes proposed herein. In these examples, a source image which has been mastered on a 4000 nits high dynamic range display is mapped to be displayed on a standard dynamic range display. The object colors of the images in FIGS. 5(b), 6(b), 7(b) and 8(b), which have been processed according to various embodiments of the present disclosure, are more faithful to the source images than those of the images FIGS. 5(a), 6(a), 7(a) and 8(a), which have been mapped using processes of other proposals. In dark images, more details are preserved on the right hand side of table.

Figure 9:
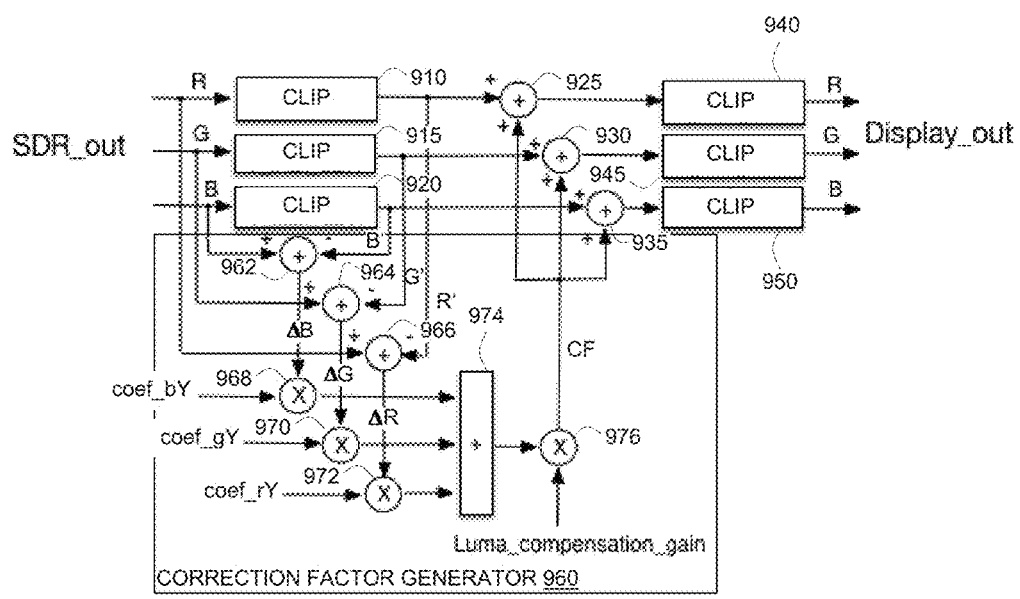
FIG. 9 is a block diagram illustrating a clip manager according to an embodiment of the present disclosure.

FIG. 9 is a block diagram illustrating a clip manager 900 according to an embodiment of the present disclosure. The contrast corrector 900 may accept standard dynamic range ("SDR") RGB image data at inputs thereof. The SDR RGB data may have component values that exceed a maximum brightness ("Y") of an associated display. The contrast corrector 900 also may alter image data to account for limitations in the display.

The clip manager 900 may include a processing pipeline that includes a first stage of clipping units 910-920, a set of intermediate adders 925-935 and a second stage of clipping units 940-950. A first stage clipping unit, an intermediate adder and a second stage clipping unit may be provided for each component. For example, in the embodiment illustrated in FIG. 9, clipping units 910 and 940 and intermediate adder 925 are provided for the red color component, clipping units 915 and 945 and intermediate adder 930 are provided for the green color component, and clipping units 920 and 950 and intermediate adder 935 are provided for the blue color component.

The clip manager 900 may include a correction factor generator 960 that may include a plurality of subtractors 962-966 and scalers 968-972, one for each color component. The correction factor generator 960 also may include another adder 974 having inputs coupled to the scalers 968-972 and scaler 976 for a luma compensation gain value. An output of the scaler 976 may be input to each of the intermediate adders 925-935 in the color component processing pipeline.

During operation, the contrast corrector 900 may receive image data on its RGB inputs. The first stage clipping units 910-920 may clip image data of each component, if necessary to a predetermined maximum value associated with a contrast condition that is being addressed. Values presented at outputs of the first stage clipping units 910-920, therefore, may differ from the values at the inputs for one or more of the components.

The subtractors 962-966 may determine differences between the data values presented at the inputs and the outputs of each of the first stage clipping units 910-920. For example, if an input red component value R were clipped to a value R', the subtractor 966 may generate an output $\Delta R=R-R'$. Similarly, subtractors 964 and 962 may generate $\Delta G$ and $\Delta B$ values, respectively, as $\Delta G=G-G'$ and $\Delta B=B-B'$, where G and B represent input green and blue component values and G' and B' represent output green and blue component values. In cases where no clipping is performed by the first stage clip units 910-920 because the input R, G and/or B values need not be clipped, $\Delta R$, $\Delta G$ and/or $\Delta B$ may be zero.

The scalars 968-970, adder 974 and scalar 976 may collaborate to generate a luma correction factor that is input to the intermediate adders 925-935. The scalers 968-970 may scale the $\Delta R$, $\Delta G$ and $\Delta B$ values output from the subtractors 962-966 by respective scaling factors coef_rY, coef_gY and coef_bY. The scaling factors may be selected according to the color conversion to be performed by the system. For example, in a system employing RGB to YU'V' conversion, the scaling factors may be given by:

coef_rY=0.299,
coef_gY=0.587, and
coef_bY=0.114.

The adder 974 may sum the values obtained by the scalers 968-970 and the scalar 976 may multiply the value output from the adder by a factor, called a luma compensation gain. Thus, an output from the correction factor generator 960 may be given by:

$$CF=LCG(coef\_rY^*\Delta R+coef\_gY^*\Delta G+coef\_bY^*\Delta B),$$

where LCG represents the luma compensation gain.

The correction factor CF may be input to the intermediate adders 925-935, where it may be added to the color component values output from the first stage clipping units 910-920. The resultant values may be output from the intermediate adders 925-935 to the second stage clipping units 940-950. Each second stage clipping unit 940, 945, 950 may clip the input values to the same predetermined maximum values that were applied by the first stage clipping units 910-920.

Accordingly, when an input value causes clipping of one or more color components at the first stage clipping units 910-920, the correction factor generator 960 may introduce a correction factor CF to the color component(s) that were not clipped (also to the clipped component). The second stage clipping units 910-920 may apply clipping to any color component that exceeds the maximum component value as a result of the correction factor CF. The resultant image data is expected to have better contrast than application of a single stage of clipping.

The contrast corrector 900 may find application in a variety of applications. As discussed, the contrast corrector 900 may find application in the embodiments illustrated in FIGS. 2 and 4, where RGB to YUV correction may cause luma Y values to exceed maximum values permitted for an image sink. In such a case, the first and second stage clipping units 910-920, 940-950 may clip component values at maximum R', G' and B' values that would generate Y at the limit of its permissible value. In other embodiments, where image sinks may have irregular wide gamut properties, the first and second stage clipping units 910-920, 940-950 may clip component values at maximum R', G' and B' values at the limit of the display.

The foregoing discussion has described operation of the embodiments of the present disclosure in the context of electronic devices that receive and process image data. Commonly, these electronic devices may be composed of integrated circuits, such as application specific integrated circuits, field programmable gate arrays and/or digital signal processors. Alternatively, they can be embodied in computer programs that execute on processing devices, such computer programs typically are stored in non-transitory computer-readable storage medium such as electronic-, magnetic- and/or optically-based storage devices, where they are read to a processor under control of an operating system and executed. The image processing system may be contained with display devices or within other devices that are paired with the display device, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

Several embodiments of the disclosure are specifically illustrated and/or described herein. However, it will be appreciated that modifications and variations of the disclosed embodiments are covered by the above teachings and within the purview of the appended claims without departing from the spirit and intended scope of the disclosure.

I claim:

1. An image processing method, comprising:
    first converting input image data from a source color space to a converted image in a target color space having a linear brightness color component and other color components, the brightness color component being orthogonal to the other color components;
    second converting the brightness component of the converted image data from the linear representation to a perceptual representation;
    altering the converted brightness component of the converted image data according to control parameters derived from viewing conditions of an output device;
    third converting the altered brightness component from the perceptual representation to a linear representation; and
    fourth converting the altered linear brightness component obtained from the third converting and the other color components obtained from the first converting to a color space of the output device.

2. The method of claim 1, wherein the target color space is a Y u'v' color space of CIE 1976.

3. The method of claim 1, wherein the target color space is an XYZ color space of CIE 1931.

4. The method of claim 1, wherein the target color space is an L*a*b* color space of CIE 1976.

5. The method of claim 1, wherein the control parameters are derived from a brightness rating of the output device.

6. The method of claim 1, wherein the control parameters are derived from a dynamic range capability of the output device.

7. The method of claim 1, wherein the control parameters are derived from an ambient viewing condition around the output device.

8. The method of claim 1, further comprising displaying, on the output device, the converted image data having the color space of the output device.

9. The method of claim 1, further comprising storing, on a storage device for delivery to the output device, the converted image data having the color space of the output device.

10. The method of claim 1, further comprising transmitting, to the output device, the converted image data having the color space of the output device.

11. The method of claim 1, wherein the source color space and the target color space are the same color space.

12. The method of claim 1, wherein the source color space and the target color space are different color spaces.

13. The method of claim 1, further comprising:
    first clipping each color component value of the converted image data in the color space of the output device that goes beyond a maximum component value to the maximum component value; and
    generating a contrast correction factor, by:
        for each color component value, determining a difference between the component's input value and the component's value after clipping;
        generating a correction factor from scaled difference values of the components; and
        adding the correction factor to the component values after the first clipping; and
        second clipping each corrected color component value that goes beyond the maximum component value to the maximum component value.

14. The method of claim 1, wherein the converting to a color space of the output device uses the other color components without conversion to the perceptual representation.

15. An apparatus, comprising:
    a first color converter to convert input image data from a source color space to a target color space, the target color space having a brightness color component with a linear representation, wherein the brightness color component orthogonal to other color components of the target color space;

a first quantization converter to convert the brightness component of the image data from a linear representation to a perceptual representation;

an intensity mapper to alter the brightness color component of the converted image data according to control parameters derived from viewing conditions of an output device;

a second quantization converter to convert the altered brightness color component data of the image data from the perceptual representation to a linear representation; and a second color converter to convert the altered linear brightness component obtained from the second quantization converter and the other color components obtained from the first color converter to a color space of the output device.

16. The apparatus of claim 15, wherein the target color space is a Y u'v' color space of CIE 1976.

17. The apparatus of claim 15, wherein the target color space is an XYZ color space of CIE 1931.

18. The apparatus of claim 15, wherein the target color space is an L*a*b* color space of CIE 1976.

19. The apparatus of claim 15, wherein the control parameters are derived from a brightness rating of the output device.

20. The apparatus of claim 15, wherein the control parameters are derived from a dynamic range capability of the output device.

21. The apparatus of claim 15, wherein the control parameters are derived from an ambient viewing condition around the output device.

22. The apparatus of claim 15, wherein the first and second color converters, the first and second quantization converters and the intensity mapper are provided within the output device.

23. The apparatus of claim 15, wherein the first and second color converters, the first and second quantization converters and the intensity mapper are provided within a device separate from the output device.

24. The apparatus of claim 15, wherein the other color components bypass the quantization converters.

25. A non-transitory computer-readable storage medium, having computer readable program instructions stored thereon that, when executed by a processing device, causes the device to:

convert input image data from a source color space to a converted image in a target color space having a linear brightness color component and other color components, the brightness color component being orthogonal to the other color components;

convert the brightness component of the converted image data from the linear representation to a perceptual representation;

alter the converted brightness component of the converted image data according to control parameters derived from viewing conditions of an output device;

convert the altered brightness component from the perceptual representation to a linear representation; and convert the altered linear brightness component and the other color components of the converted image to a color space of the output device from the target color space.

26. The medium of claim 25, wherein the program instructions, when executed by the processing device, cause the other color components to be converted from the target color space to the color space of the output device without conversion to the perceptual representation.

27. An image processing method, comprising:

converting an input image from a source color space to a Yu'v' color space of CIE 1976 having a Y component and other color components;

converting the Y component of the Yu'v' image data from a linear representation to a perceptual representation;

altering the perceptual Y component of the converted image data according to control parameters derived from viewing conditions of an output device;

converting the altered Y color component of the image data from the perceptual representation to a linear representation; and converting the altered linear brightness component and the other color components of the Yu'v' image data to a color space of the output device.

28. An image processing method, comprising:

first clipping each color component value of input image data that goes beyond a maximum component value to the maximum component value, the maximum component value representing a maximum value of the respective color component that can be accepted by a display device that is to display the input image data;

generating a contrast correction factor, by:
　for each color component value, determining a difference between the component's input value and the component's value after clipping, and
　generating a correction factor from scaled difference values of the components;

adding the correction factor to the component values after the first clipping; and second clipping each corrected color component value that goes beyond the maximum component value to the maximum component value.

* * * * *